United States Patent
Abdalla et al.

(10) Patent No.: US 12,042,753 B2
(45) Date of Patent: Jul. 23, 2024

(54) INTEGRATED MULTIFUNCTIONAL ENDCAP SEAL MEMBER

(71) Applicant: Cummins Filtration IP, Inc., Columbus, IN (US)

(72) Inventors: Wassem Abdalla, Fischers, IN (US); Gerard Malgorn, Ergue Gaberic (FR)

(73) Assignee: Cummins Filtration IP, Inc., Columbus, IN (US)

( * ) Notice: Subject to any disclaimer, the term of this patent is extended or adjusted under 35 U.S.C. 154(b) by 448 days.

(21) Appl. No.: 17/360,092

(22) Filed: Jun. 28, 2021

(65) Prior Publication Data

US 2021/0322905 A1  Oct. 21, 2021

Related U.S. Application Data

(63) Continuation of application No. PCT/US2019/067497, filed on Dec. 19, 2019.

(60) Provisional application No. 62/786,602, filed on Dec. 31, 2018.

(51) Int. Cl.
  *B01D 35/30* (2006.01)
  *B01D 29/13* (2006.01)

(52) U.S. Cl.
  CPC .......... *B01D 35/306* (2013.01); *B01D 29/13* (2013.01); *B01D 2201/295* (2013.01); *B01D 2201/302* (2013.01); *B01D 2201/304* (2013.01); *B01D 2201/347* (2013.01)

(58) Field of Classification Search
  CPC ................. B01D 35/306; B01D 29/13; B01D 2201/295; B01D 2201/302; B01D 2201/304; B01D 2201/347; B01D 46/2411; B01D 2201/291; B01D 2265/04; B01D 2271/027; B01D 27/04; B01D 27/08
  See application file for complete search history.

(56) References Cited

U.S. PATENT DOCUMENTS

| | | | | |
|---|---|---|---|---|
| 4,976,852 | A | * | 12/1990 | Janik ...................... B01D 17/00 210/493.1 |
| 5,415,677 | A | | 5/1995 | Ager et al. |
| 5,484,466 | A | * | 1/1996 | Brown ................... B01D 46/64 55/498 |
| 6,019,229 | A | | 2/2000 | Rao |
| 6,447,567 | B1 | | 9/2002 | Ehrenberg |
| 2002/0036165 | A1 | | 3/2002 | Sommer et al. |
| 2005/0178716 | A1 | | 8/2005 | Suri |
| 2010/0044303 | A1 | * | 2/2010 | Perrault ................ B01D 29/111 210/497.01 |
| 2011/0036770 | A1 | * | 2/2011 | Jokschas ............ B01D 46/0004 210/440 |

(Continued)

OTHER PUBLICATIONS

First Office Action issued for Chinese Patent Application No. CN 201980086477.7 issued Mar. 3, 2022, 4 pages.

(Continued)

*Primary Examiner* — Waqaas Ali
(74) *Attorney, Agent, or Firm* — Foley & Lardner LLP (57) ABSTRACT

A filter element comprises a filter media for filtering a fluid, an endcap positioned at an axial end of the filter media, and a seal member. The endcap comprises a main wall that defines a central aperture. The seal member is positioned within the central aperture of the endcap and is adhered to the endcap.

16 Claims, 8 Drawing Sheets

(56) References Cited

U.S. PATENT DOCUMENTS

2017/0080365 A1    3/2017  Morris et al.

OTHER PUBLICATIONS

International Search Report and Written Opinion issued for PCT Application No. PCT/US2019/067497, issued Feb. 25, 2020, 9 pages.
European Search Report issued for European Patent Application No. EP19906678.8 issued Jun. 10, 2022, 8 pages.

* cited by examiner

INTEGRATED MULTIFUNCTIONAL ENDCAP SEAL MEMBER

CROSS REFERENCE TO RELATED APPLICATIONS

The application is a continuation of PCT Application No. PCT/US2019/067497 filed Dec. 19, 2019, which claims the benefit of and priority to U.S. Provisional Patent Application No. 62/786,602 filed Dec. 31, 2018. The contents of these applications are incorporated herein by reference in their entirety and for all purposes.

FIELD

The present invention relates generally to seal members for endcaps of filter assemblies.

BACKGROUND

In conventional cartridge-type, bottom load filter assemblies, the clean side of the filter media typically is sealed from the dirty side of the filter media with either a facial seal member or a radial seal member. However, a facial seal member may rely on a spring load and is subject to down-shifting at the end of a service interval due to a higher differential pressure. Further, the radial seal member may increase the complexity of the design, take up more space, and make servicing the filter assembly more challenging.

Figure 1:
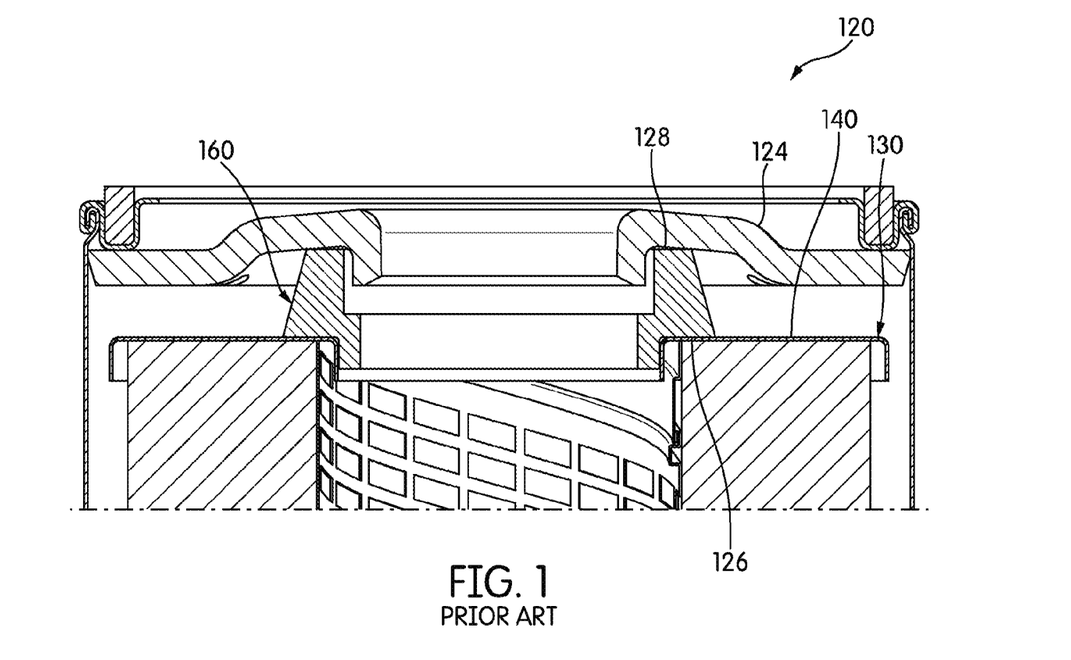
FIG. 1 is a cross-sectional view of a conventional filter assembly.

FIG. 1 shows an example of a conventional filter assembly 120 with a conventional filter element 130 (with a conventional top endcap 140), a filter head 124, and a conventional seal member 160 (which forms a facial/axial seal with the filter head 124). Due to the configuration of the seal member 160 with the filter element 130, two potential leak paths are created around the seal member 160. For example, there is a first leak path 126 between a top surface of the top endcap 140 of the filter element 130 and a bottom surface of the seal member 160 (and between an inner surface of the central aperture of the top endcap 140 and an outer surface of the central aperture of the seal member 160). Additionally, there is a second leak path 128 between the bottom surface of the filter head 124 and the top surface of the seal member 160 (and between an outer surface of the central aperture of the filter head 124 and an inner surface of the central aperture of the seal member 160).

SUMMARY

Various embodiments provide for a filter element comprising a filter media for filtering a fluid, an endcap, and a seal member. The endcap is coupled to and positioned at an axial end of the filter media and comprises a main wall that defines a central aperture. The seal member is positioned within the central aperture of the endcap and is adhered to the endcap.

Various other embodiments provide for a filter assembly comprising a filter head, a housing attachable to the filter head, and a filter element at least partially contained within the housing. The filter element comprises a filter media for filtering a fluid, an endcap, and a seal member. The end cap is coupled to and positioned at an axial end of the filter media and comprises a main wall that defines a central aperture. The seal member is positioned within the central aperture of the endcap and is adhered to the endcap.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to filter assemblies with an endcap and an integrated seal member. As described further herein, the seal member is integrated with the endcap, and the seal member is multifunctional by both sealing the filter element within the filter assembly and functioning as an endcap skirt. The seal member provides a cost effective solution that eliminates a potential leak path, provides new engine integrity protection (EIP) against counterfeit and/or unauthorized filter elements, better utilizes the envelope space, and increases the ease of servicing compared to conventional filter assemblies.

Filter Assembly

Figure 2:
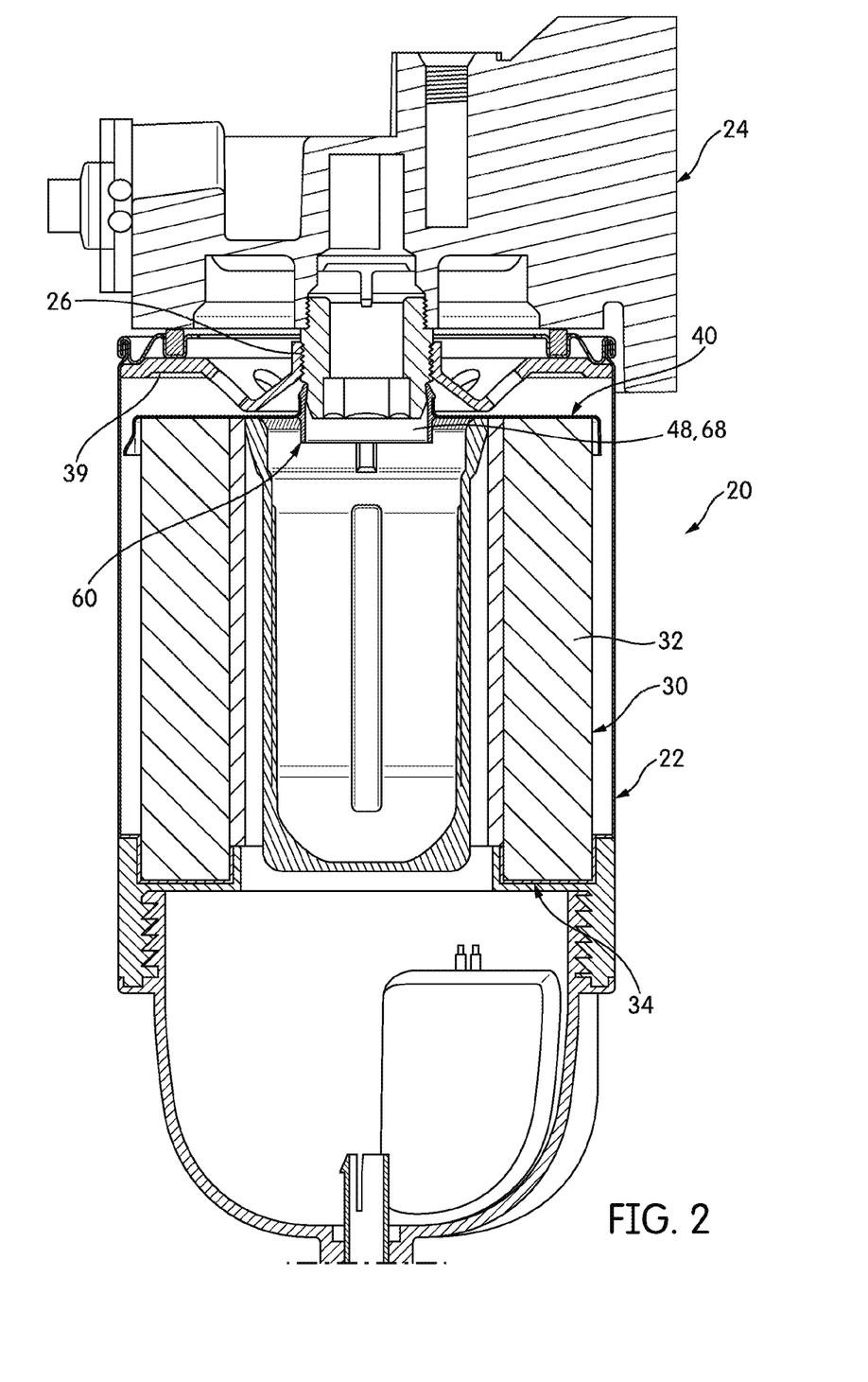
FIG. 2 is a cross-sectional view of a filter assembly according to one embodiment.

FIG. 2 shows a filter assembly 20 that is configured to filter a fluid (e.g., fuel or lube) and comprises a housing 22, a filter head 24, and a filter element 30. The housing 22 and the filter head 24 are attachable to each other and cooperate to house or contain the filter element 30.

The filter element 30 is configured to be at least partially contained or housed within at least one of the housing 22 and the filter head 24. The filter element 30 comprises a filter media 32, a first endcap (referred to herein as the top endcap 40), a second endcap (referred to herein as the bottom endcap 34), and a seal member 60. The filter media 32 is configured to filter the fluid and includes a dirty or unfiltered side for receiving dirty or unfiltered fluid and a clean or filtered side for releasing clean or filtered fluid. An inner surface of the filter media 32 defines a central opening or area that fluid flows through either immediately before or after filtration (depending on the overall configuration of the filter assembly 20). The filter media 32 may optionally include an inner support structure that comprises the inner surface of the filter media 32. As described further herein, the seal member 60 is integrated with the top endcap 40. The filter element 30 of FIG. 2 also includes a nutplate 39 configured to engage with and attach to the filter head 24. The nutplate 39 is positioned between the top surface of the top endcap 40 and the filter head 24 (where the filter media 32 is positioned along the bottom surface of the top endcap 40).

The top endcap 40 and the bottom endcap 34 are positioned at opposite ends of the filter media 32 and extend or span (radially) between the filtered and unfiltered sides of the filter media 32. The top endcap 40 is positioned at the top of the filter media 32, and the bottom endcap 34 is positioned at the bottom of the filter media 32.

One end of the housing 22 is removably coupled to the filter head 24 such that the top endcap 40 is positioned between the filter head 24 and the top surface of the filter media 32. Accordingly, fluid can flow between the filter head 24 and the inner area of the filter media 32 through the central aperture 48 of the top endcap 40 (as described further herein). The housing 22 and/or the filter head 24 may include an inlet and an outlet that allow fluid to flow into and out from, respectively, the filter assembly 20 for filtration. The filter head 24 may be configured to fluidly attach the filter assembly 20 to other components, such as an engine.

Top Endcap

Figure 3:
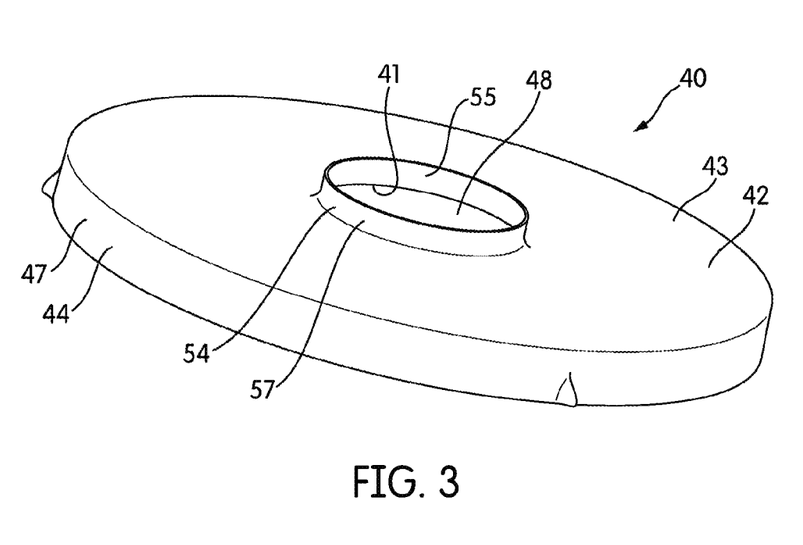
FIG. 3 is a perspective view of a top endcap of the filter assembly of FIG. 2.

As shown in FIG. 3, the top endcap 40 comprises a main wall 42, a lower lip 44, and an upper lip 54. The top endcap 40 (in particular the main wall 42 and the upper lip 54) defines a central aperture 48 that allows fluid to flow in or out of the central region or area of the filter media 32 from or to, respectively, the filter head 24 (depending on the overall configuration of the filter assembly 20).

Figure 5:
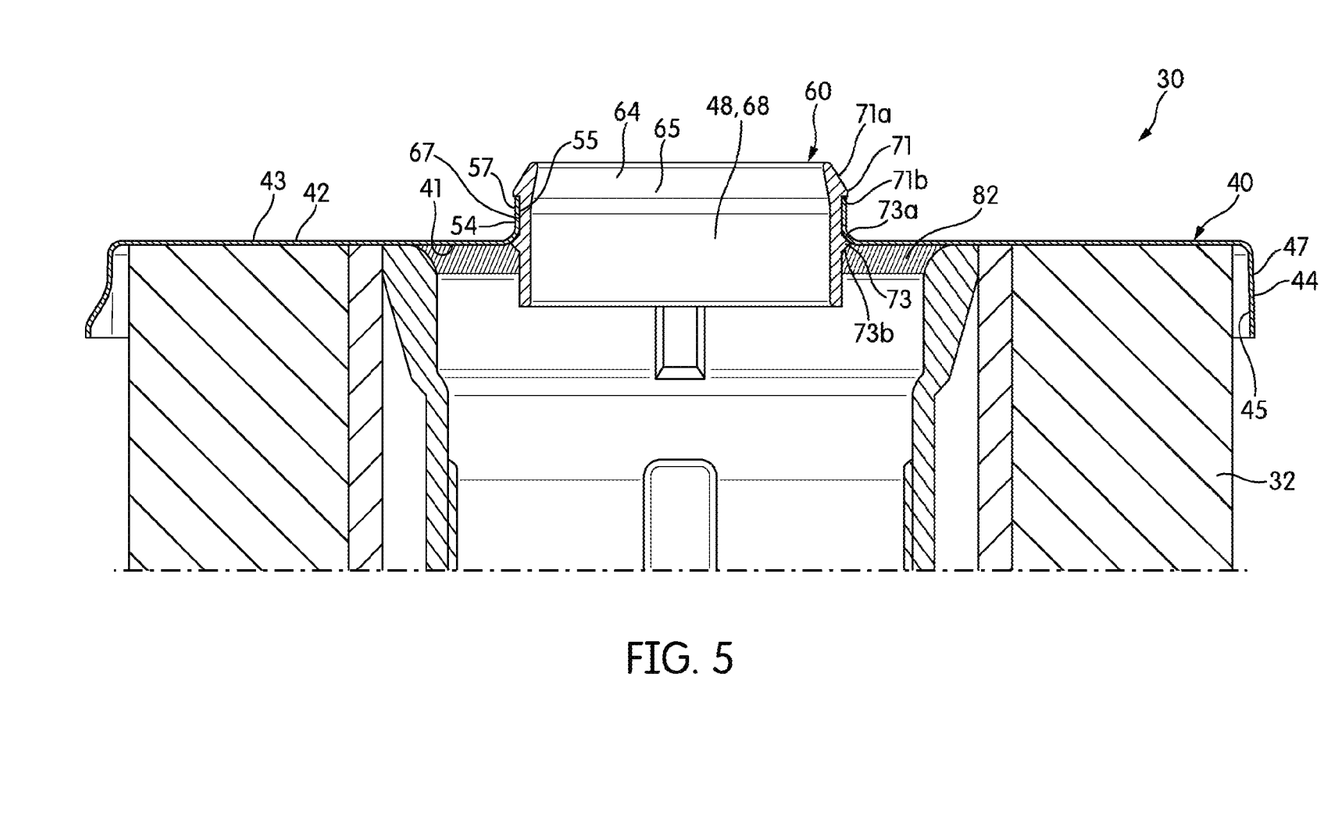
FIG. 5 is a cross-sectional view of a filter element of the filter assembly of FIG. 2.
Figure 6A:
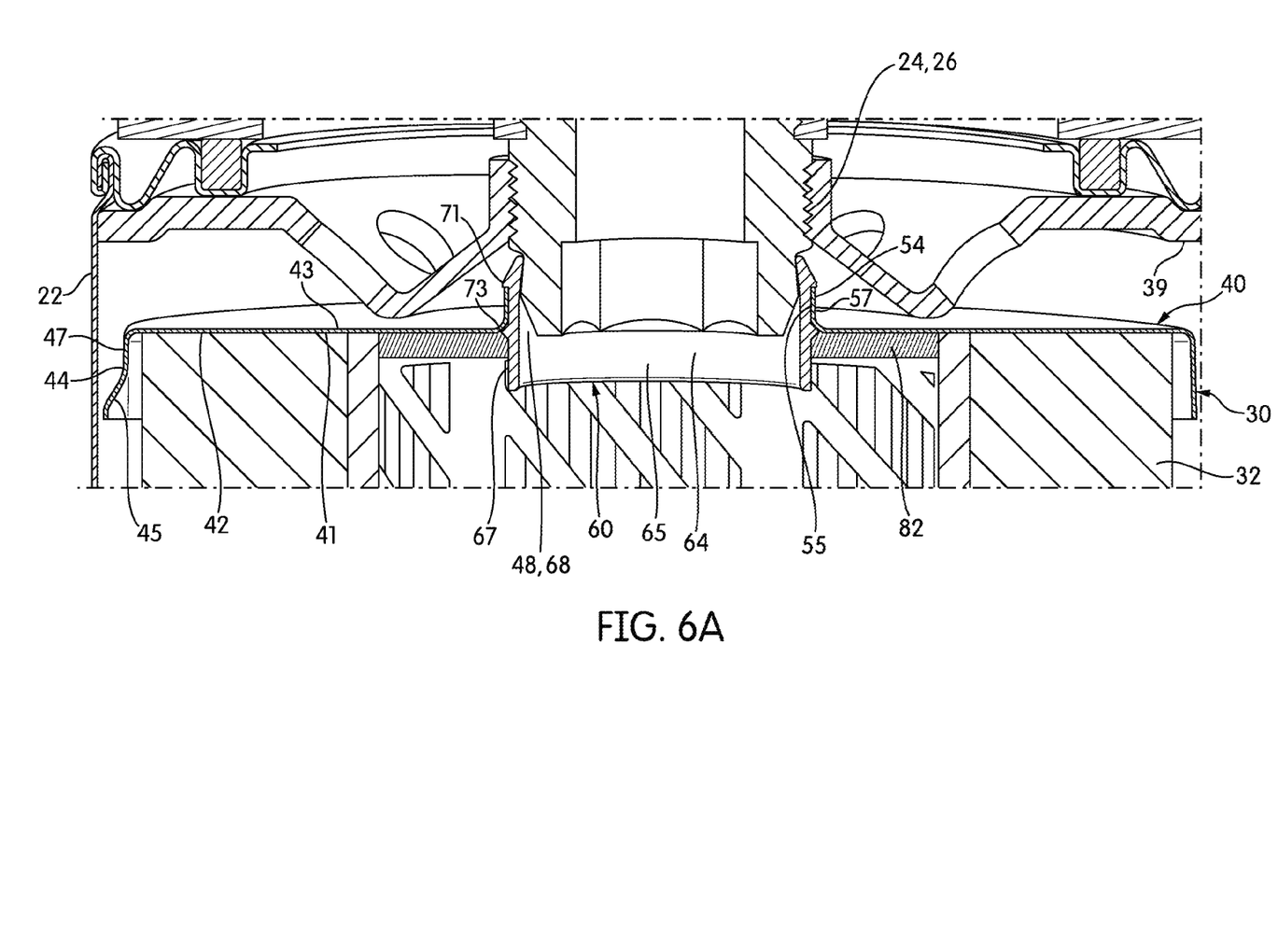
FIG. 6A is a cross-sectional view of a portion of the filter assembly of FIG. 2.

The main wall 42 extends radially outward from the central aperture 48 and the upper lip 54 along a substantially flat plane in the radial direction. The main wall 42 has a lower surface 41 and an upper surface 43 that are on opposite sides of the main wall 42 in an axial direction. The lower surface 41 of the main wall 42 faces toward (and abuts (optionally through an adhesive)) the top axial end of the filter media 32 and faces away from the filter head 24. The upper surface 43 of the main wall 42 faces toward the filter head 24 and away from the filter media 32 (as shown in FIG. 6A). The main wall 42 is sized and shaped to completely cover the top end of the filter media 32 and extend radially between the filtered and unfiltered sides of the filter media 32 (as shown in FIGS. 5-6A).

The lower lip 44 extends axially from and is positioned along the lower surface 41 of the main wall 42, extending below the lower surface 41 in an axial direction away from the upper surface 43 of the main wall 42. The lower lip 44 extends completely around the entire outer perimeter of the main wall 42. The lower lip 44 extends axially toward the filter media 32. Accordingly, the lower lip 44 extends along a portion of the axial height (along the outer perimeter and surface) of the filter media 32 (as shown in FIGS. 5-6A). The lower lip 44 comprises an inner surface 45 and an outer surface 47 that are on opposite sides of the lower lip 44 along the radial direction. The inner surface 45 faces radially inwardly toward the main wall 42 and the central aperture 48 (and the outer surface of the filter media 32), and the outer surface 47 faces radially outwardly in a direction away from the main wall 42 and the central aperture 48 (and the filter media 32).

The upper lip 54 extends axially from and is positioned along the upper surface 43 of the main wall 42 of the top endcap 40, extending above the upper surface 43 in the axial direction away from the lower surface 41 of the main wall 42. The upper lip 54 extends completely around the entire inner perimeter of the main wall 42, thereby defining the central aperture 48 of the top endcap 40. The upper lip 54 extends axially away from the filter media 32. The upper lip 54 comprises an inner surface 55 and an outer surface 57 that are on opposite sides of the upper lip 54 along the radial direction. The inner surface 55 faces radially inwardly toward the central aperture 48, and the outer surface 57 faces radially outwardly in a direction toward the main wall 42 and the lower lip 44 (and therefore away from the central aperture 48). As described further herein, the seal member 60 attaches to the inner surface 55 of the upper lip 54 such that the upper lip 54 provides support to the seal member 60.

Due to the positioning of the seal member 60 relative to the top endcap 40 (in particular, the lower portion of the seal member 60, as described further herein), the top endcap 40 does not extend axially into the central opening or area of the filter media 32 and may not comprise any portion (e.g., a lower lip or skirt) in the center area of the top endcap 40 that both radially aligns with the central opening of the filter media 32 and extends below the main wall 42 and towards or into the central opening of the filter media 32.

The top endcap 40 may be constructed out of a variety of different materials, including but not limited to plastic or metal (e.g., a stamped steel endcap).

Seal Member

The integrated, multifunctional endcap gasket or seal member 60 of the filter element 30 allows the filter element 30 to seal with the filter head 24 (as described further herein). As described further herein, the seal member 60 both seals between the filtered and unfiltered sides of the filter media 32 and also acts as an internal skirt of the top endcap 40. Furthermore, the configuration of the seal member 60 uses less material than conventional gaskets.

Figure 4A:
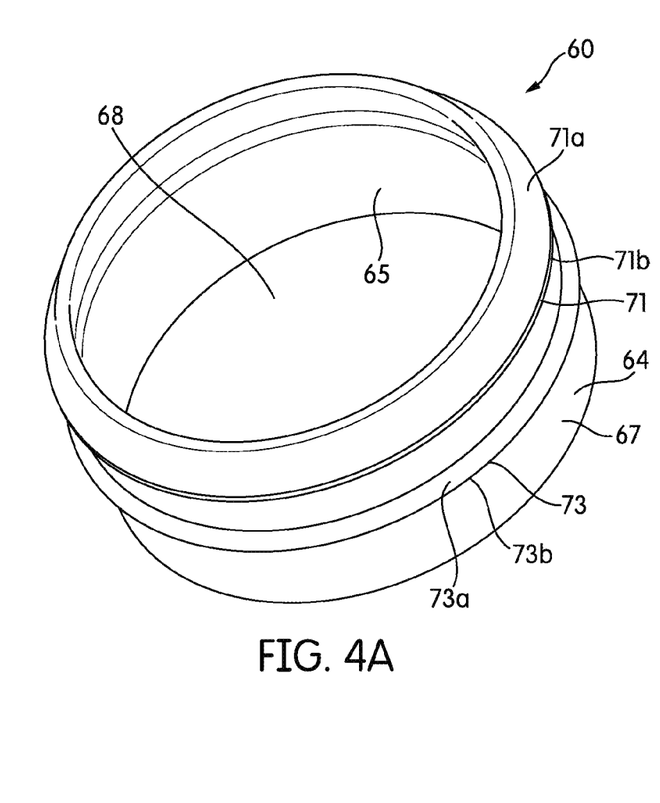
FIG. 4A is a perspective view of a seal member of the filter assembly of FIG. 2.
Figure 4B:
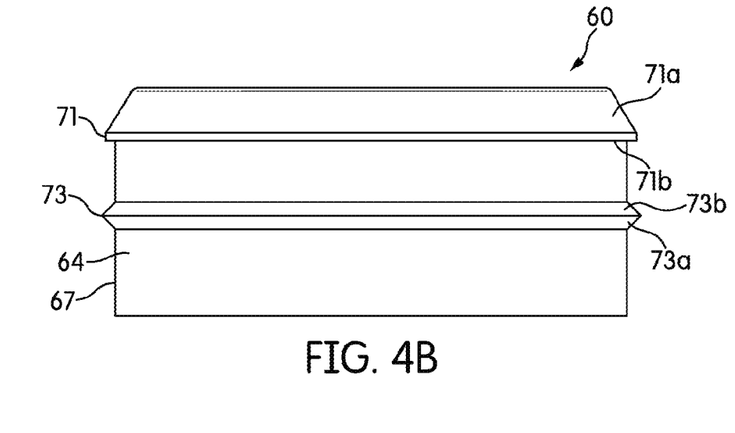
FIG. 4B is a side view of the seal member of FIG. 4A.
Figure 4C:
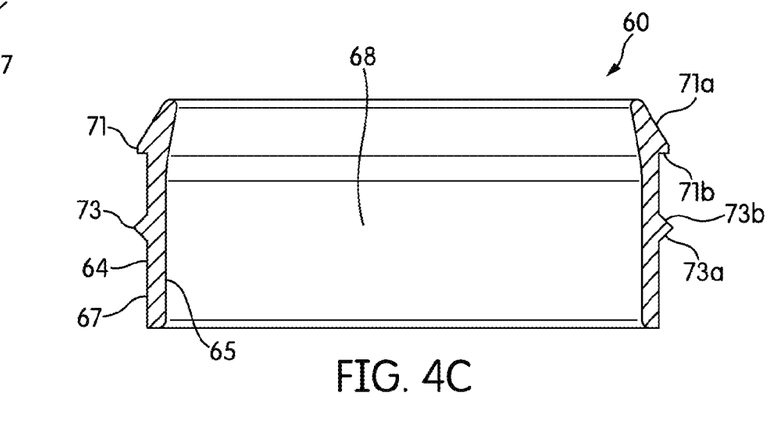
FIG. 4C is a cross-sectional view of the seal member of FIG. 4A.

As shown in FIGS. 4A-4C, the seal member 60 comprises a circumferential wall 64, a first or upper flange or extension 71, and a second or lower flange or extension 73, each of which extends radially away from the circumferential wall 64. The circumferential wall 64 extends axially and includes an inner surface 65 and an outer surface 67 that are on opposite sides of the circumferential wall 64 in the radial direction. The seal member 60 (in particular the circumferential wall 64) defines a central aperture 68 with a central axis that directly corresponds to and aligns with a central axis of the central aperture 48 of the top endcap 40, such that fluid can flow in or out of the central opening of the filter media 32 from or to, respectively, the filter head 24 (depending on the overall configuration of the filter assembly 20) through the central aperture 68 (and the central aperture 48).

Both the upper extension 71 and the lower extension 73 are positioned along and extend radially outwardly from the outer surface 67 of the circumferential wall 64 of the seal member 60, extending completely around the entire circumferential wall 64. The upper extension 71 is positioned toward or at the axial top end of the seal member 60 (i.e., closer to the axial top end of the circumferential wall 64 than the lower extension 73), while the lower extension 73 is positioned axially below the upper extension 71, in a central opening or area of the seal member 60 (i.e., closer to the axial bottom end of the circumferential wall 64 of the seal member 60 than the upper extension 71). The upper and lower extensions 71, 73 allow the seal member 60 to securely attach to the upper lip 54 of the top endcap 40 and prevent the seal member 60 from being dislodged from or moved (in particularly axially moved) within the central aperture 48 of the top endcap 40, as described further herein.

The upper extension 71 may comprise an upper surface 71a that extends at a relatively small angle (e.g., less than approximately 45° relative to the outer surface 67 of the circumferential wall 64) in order to be inserted first axially through the central aperture 48 of the top endcap 40 more easily (during assembly, for example). The upper surface 71a is angled downwardly toward the axial bottom end of the circumferential wall 64. The upper extension 71 may also comprise a lower surface 71b that extends a relatively higher angle (e.g., between approximately 45° and 90° relative to the outer surface 67 of the circumferential wall 64) in order to prevent the upper extension 71 from moving backward axially through the central aperture 48 of the top endcap 40 and detaching from the top endcap 40. The lower surface 71b is angled upwardly toward the axial top end of the circumferential wall 64. The upper surface 71a of the upper extension 71 is closer to the axial top end of the seal member 60 and the axial top end of the circumferential wall 64 than the lower surface 71b of the upper extension 71 (such that the lower surface 71b of the upper extension 71 abuts against or along and engages the top surface of the upper lip 54 of the top endcap 40). The upper surface 71a and the lower surface 71b of the upper extension 71 may optionally be angled toward each other and positioned such that the upper extension 71 has a substantially triangular cross-section (with the circumferential wall 64). However, it is understood that the upper extension 71 may have other cross-sectional shapes, such as rectangular or semi-circular.

The lower extension 73 also comprises an upper surface 73a and a lower surface 73b. The upper surface 73a of the lower extension 73 is closer to the upper extension 71 (and thus to the axial top end of the seal member 60 and the axial top end of the circumferential wall 64) than the lower surface 73b of the lower extension 73 such that the upper surface 73a of the lower extension 73 abuts against or along and engages the bottom surface of the upper lip 54 of the top endcap 40 and/or the lower surface 41 of the main wall 42 of the top endcap 40. The upper surface 73a and the lower surface 73b may extend at angles from the outer surface 67 of the circumferential wall 64 (e.g., at approximately 45° relative to the outer surface 67 of the circumferential wall 64). The upper surface 73a is angled downwardly toward the axial bottom end of the circumferential wall 64, and the lower surface 73b is angled upwardly toward the axial top end of the circumferential wall 64. The upper surface 73a and the lower surface 73b of the lower extension 73 may optionally be angled toward each other and positioned such that the lower extension 73 has a substantially triangular cross-section (with the circumferential wall 64). However, it is understood that the lower extension 73 may have other cross-sectional shapes, such as rectangular or semi-circular.

The circumferential wall 64 includes an upper portion and a lower portion. The upper portion of the circumferential wall 64 of the seal member 60 refers to the portion of the circumferential wall 64 that is between the lower extension 73 and the axial top end of the seal member 60. When the seal member 60 is positioned and assembled within the central aperture of the top endcap 40, the upper portion of the circumferential wall 64 is positioned at least partially within the central aperture 48 of the top endcap 40 and within the upper lip 54 of the top endcap 40. The upper portion of the circumferential wall 64 extends above the axial top end of the upper lip 54 of the top endcap 40.

The lower portion of the circumferential wall 64 of the seal member 60 refers to the portion of the circumferential wall 64 that extends below the lower extension 73, between the lower extension 73 and the axial bottom end of the seal member 60. As described further herein, the lower portion of the circumferential wall 64 of the seal member 60 extends axially below the main wall 42 of the top endcap 40 and into the central opening of the filter media 32. Furthermore, the lower portion of the circumferential wall 64 of the seal member 60 extends axially below all portions of the top endcap 40 that are radially aligned with central opening of the filter media 32. Accordingly, the lower portion functions as an endcap skirt beneath the main wall 42 and helps contain the adhesive 82 that adheres the seal member 60 and the filter media 32 to the top endcap 40. In particular, the adhesive 82 may extend radially within the central opening of the filter media 32 along a lower surface 41 of the main wall 42 of the top endcap 40, between an inner surface of the filter media 32 (which may be an internal support structure of the filter media 32) and an outer surface of the lower portion of the circumferential wall 64. Due to the seal member 60, the top endcap 40 may therefore not include any internal endcap skirt, according to one embodiment.

The seal member 60 may be constructed out of a variety of different materials, including but not limited to rubber, polyurethane, etc.

Integration of the Top Endcap and the Seal Member

As shown in FIG. 5, the seal member 60 and the top endcap 40 may be integrated together in order to form a single part such that the seal member 60 and the top endcap 40 cannot be removed from each other without physical destruction of the top endcap. The respective configurations, shapes, and sizes of the top endcap 40 and the seal member 60 are complementary to each other in order to allow the seal member 60 and the top endcap 40 to attach and fit together.

To integrate the seal member 60 and the top endcap 40 together, the seal member 60 and the top endcap 40 are first attached to each other and then adhered together with an adhesive 82 (e.g., glue). In particular, the seal member 60 is inserted into and positioned within the central aperture 48 and within the upper lip 54 of the top endcap 40 (e.g., along the inner surface 55 of the upper lip 54), thus aligning the central apertures 48 and 68. The seal member 60 is positioned such that the axial top end of the seal member 60 (and the upper extension 71) are positioned at least partially axially above the top of the upper lip 54 (engaging a top surface of the upper lip 54 of the top endcap 40), and the lower extension 73 is positioned at least partially axially below both the bottom of the upper lip 54 and the lower surface 41 of the main wall 42 of the top endcap 40 (engaging at least one of the bottom surface of the upper lip 54 of the top endcap 40 and a lower surface 41 of the main wall 42 of the top endcap 40) in order to secure the seal member 60 to the upper lip 54. Accordingly, the upper lip 54 of the top endcap 40 is axially positioned axially between the upper extension 71 and the lower extension 73 of the seal member 60.

Once the seal member 60 is positioned within the top endcap 40, the lower portion of the circumferential wall 64 of the seal member 60 extends axially below the lower surface 41 of the main wall 42 of the top endcap 40 (and into the central opening of the filter media 32), thereby functioning as an internal endcap skirt of the top endcap 40 (beneath the main wall 42 of the top endcap 40) by containing the adhesive 82. In particular, the lower portion of the seal member 60 creates an adhesive area that is configured to receive, contain, and be at least partially filled with the adhesive 82 in order to attach and seal together the filter media 32, the top endcap 40, and the seal member 60.

Subsequently, the seal member 60 is attached to the top endcap 40 by being adhered to the top endcap 40, for example with the same (i.e., continuous) adhesive 82 that is used to attach the filter media 32 to the top endcap 40. The adhesive 82 is positioned in the adhesive area within the central opening of the filter media 32 that is defined by the outer surface 67 of the circumferential wall 64 of the seal member 60, the lower surface 41 of the main wall 42 of the top endcap 40, and the inner surface of the filter media 32, thus adhering and sealing both the filter media 32 and the seal member 60 to the top endcap 40. The adhesive area (and thus the adhesive 82) extends radially completely around the entire outer circumference of the seal member 60 (particularly along the entire intersection between the seal member 60 and the top endcap 40) and along the entire inner circumference of the filter media 32 that defines the central opening of the filter media 32 (particularly along the entire intersection between the filter media 32 and the top endcap 40).

Since the same adhesive 82 is used to attach or adhere both the filter media 32 and the seal member 60 to the top endcap 40, no additional manufacturing steps, assembly, operation, or materials are needed to attach the seal member 60 and the top endcap 40 together. Therefore, the filter assembly 20 (in particular, the filter element 30) may be simpler to manufacture compared to a number of conventional filter assemblies.

The adhesive 82 makes the seal member 60 an integral part of the filter element 30 (and specifically of the top endcap 40), which reduces the number of potential leak paths. For example, since the seal member 60 is adhered to the top endcap 40, the adhesive 82 eliminates any leak paths in between the seal member 60 and the top endcap 40, such as the first leak path 126 (as shown in FIG. 1 in the conventional filter assembly 120). Furthermore, by adhering the seal member 60 to the top endcap 40, the seal member 60 and the top endcap 40 are attached to each other in a low-cost process, in particular relative to overmolding plastic endcaps with rubber.

The adhesive 82 may be a variety of different materials including, but not limited to potting glue, epoxy, polyurethane, or plastisol. Alternatively or additionally, the adhesive 82 may refer to or include overmolding or the heating of an embedding operation.

Filter Element within the Filter Assembly

Figure 6B:
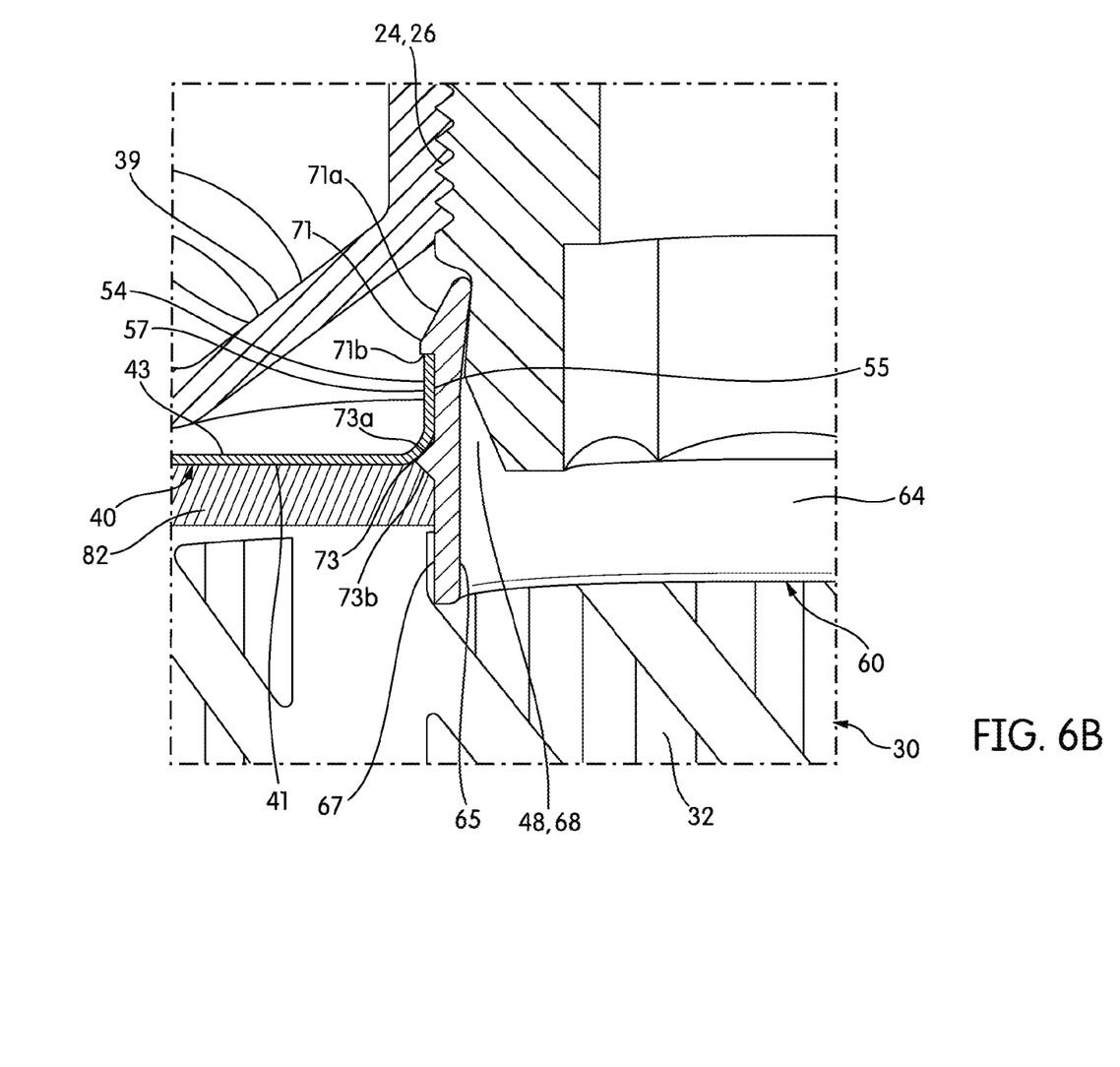
FIG. 6B is a cross-sectional, enlarged view of a portion of FIG. 6A.
Figure 7:
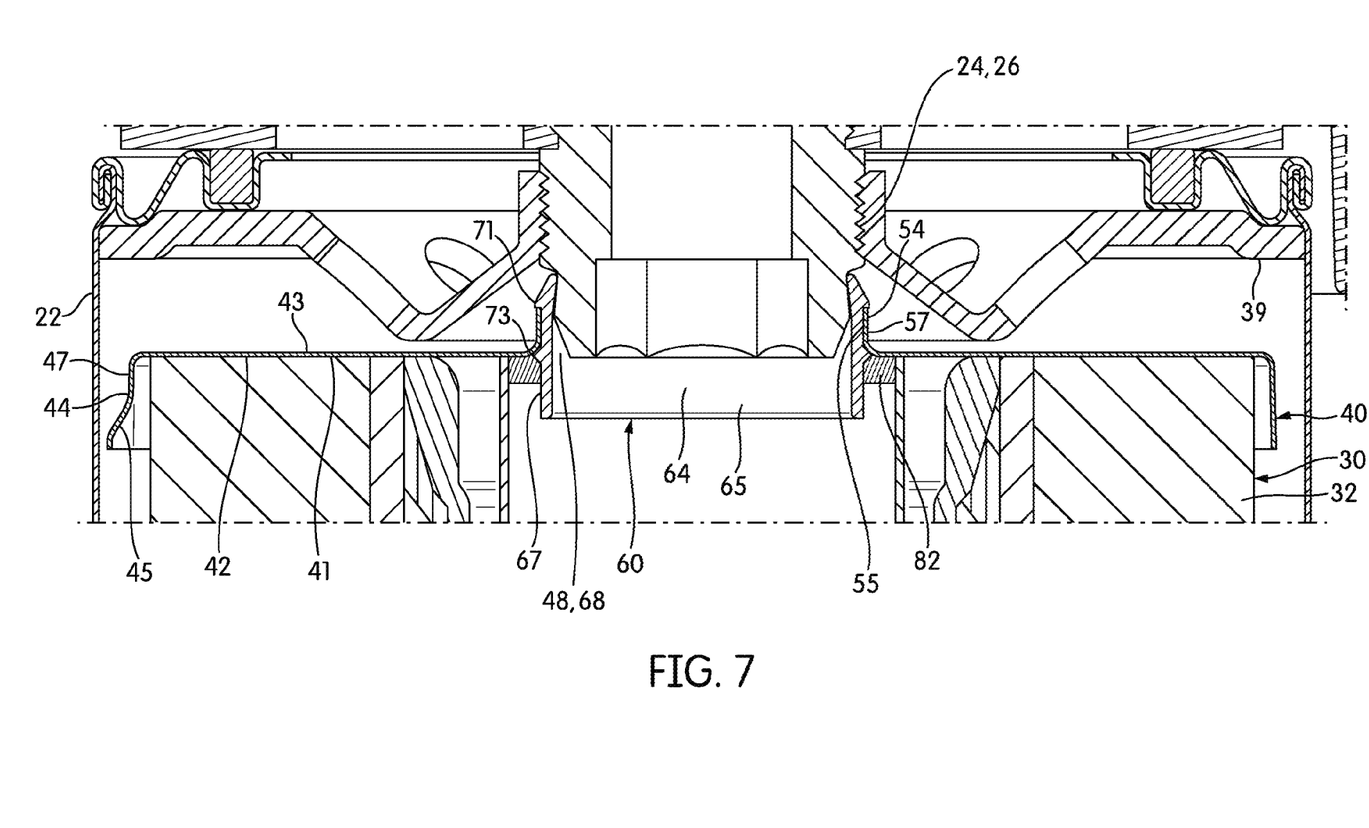
FIG. 7 is a cross-sectional view of a portion of a filter assembly according to another embodiment.

Once the seal member 60 is positioned and secured within the top endcap 40 (and the seal member 60, the top endcap 40, and the filter media 32 are attached to each other), the filter element 30 may be positioned within the housing 22 of the filter assembly 20, and the filter head 24 is then attached to the housing 22 and sealed and attached to the filter element 30, as shown in FIGS. 6A-7. During installation of the filter element, 30, a spud 26 of the filter head 24 may be threadably attached to the nutplate 39 and is directly positioned within the central aperture 68 of the seal member 60 (along the inner surface 65 of the circumferential wall 64 of the seal member 60). The entire inner circumference of the inner surface 65 of the circumferential wall 64 of the seal member 60 directly seals with the entire outer circumference of the outer surface of the spud 26 of the filter head 24 such that the filtered side and the unfiltered side of the filter media 32 are fluidly separately by the seal member 60. The rest of the filter head 24 may be subsequently screwed or attached onto the spud 26 (or screwed or attached onto the spud 26 prior to attachment to the filter element 30 and the housing 22).

As shown in FIG. 7, the seal member 60 may also be used within a filter assembly 20 that has a spin-on or cartridge-style filter element 30.

In addition to the benefits mentioned above, the seal member 60 provides a number of different benefits within the filter assembly 20. For example, due to the integration of the top endcap 40 and the seal member 60, servicing the filter assembly 20 is relatively easy compared to conventional filter assemblies. For example, the seal member 60 reduces the resistance during installation compared to a conventional radial seal member, which allows the seal member 60 to engage with the spud 26 of the filter head 24 below the threaded area of the spud 26. Due to the configuration of the seal member 60, a longer spud 26 can be used within the filter assembly 20 and with the filter element 30.

Additionally, by integrating the top endcap 40 and the seal member 60, the filter element 30 is automatically centered within the housing 22 of the filter assembly 20. Further, compared to conventional filter assemblies, the seal member 60 utilizes envelope space within the housing 22 more efficiently and can extend further upward toward and along the spud 26 (relative to the main wall 42 of the top endcap 40) to provide a better sealing connection.

By being integrated with the top endcap 40, the seal member 60 also provides better protection against differential pressure, downshifting, and seal breakage since the degree of sealing by the seal member 60 increases with and is assisted by an increase of differential pressure (which pushes the seal member 60 further against the spud 26). Therefore, even if there are some coaxial pressures, the seal member 60 can compensate for the pressures better than conventional seal members. Since the seal member 60 is a type of radial seal, any downshifting of the filter element 30 at high differential pressures will not create issues.

Due to the unique configuration of the seal member 60, the seal member 60 ensures that the correct and genuine filter element 30 (and filter media 32) is assembled with the correct rest of the filter assembly 20, thereby ensuring that the user has uninterrupted filter performance throughout the filter life.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter element comprising:
a filter media for filtering a fluid;
an endcap coupled to and positioned at an axial end of the filter media, the endcap comprising a main wall that defines a central aperture; and
a seal member positioned within the central aperture of the endcap and adhered to the endcap, the seal member comprising a circumferential wall that extends axially below the main wall of the endcap and into a central opening of the filter media, wherein an adhesive is positioned in an area within the central opening of the filter media that is defined by an outer surface of the circumferential wall of the seal member, a lower surface of the main wall of the endcap, and an inner surface of the filter media.

2. The filter element of claim 1, wherein the filter media and the seal member are adhered to the endcap with a same adhesive.

3. The filter element of claim 1, wherein the seal member is attached to the endcap with the adhesive.

4. A filter element comprising:
a filter media for filtering a fluid;
an endcap coupled to and positioned at an axial end of the filter media, the endcap comprising a main wall that defines a central aperture; and
a seal member positioned within the central aperture of the endcap and adhered to the endcap,
wherein the endcap comprises an upper lip that extends above an upper surface of the main wall of the endcap, wherein the seal member comprises an upper extension that is positioned above the top of the upper lip of the endcap.

5. The filter element of claim 4, wherein the upper extension engages a top surface of the upper lip of the endcap.

6. The filter element of claim 1, wherein the seal member comprises a lower extension that is positioned at least partially below the endcap.

7. The filter element of claim 6, wherein the endcap comprises an upper lip that extends above an upper surface of the main wall of the endcap, wherein the lower extension engages at least one of a bottom surface of the upper lip of the endcap and a lower surface of the main wall of the endcap.

8. A filter element comprising:
a filter media for filtering a fluid;
an endcap coupled to and positioned at an axial end of the filter media, the endcap comprising a main wall that defines a central aperture; and
a seal member positioned within the central aperture of the endcap and adhered to the endcap,
wherein the seal member comprises an upper extension that is positioned at least partially above the endcap and a lower extension that is positioned at least partially below the endcap, the upper extension and the lower extension configured to securely attach the seal member to the endcap.

9. The filter element of claim 8, wherein the endcap comprises an upper lip that extends above an upper surface of the main wall of the endcap, the upper lip of the endcap positioned between the upper extension and the lower extension of the seal member.

10. The filter element of claim 1, wherein the endcap does not extend axially into a central opening of the filter media.

11. The filter element of claim 1, wherein the seal member extends axially below all portions of the endcap that are radially aligned with a central opening of the filter media.

12. The filter element of claim 1, wherein the main wall of the endcap extends along a substantially flat plane in a radial direction, wherein the endcap does not include any portion that is radially aligned with the central opening of the filter media and extends below the main wall of the endcap.

13. A filter assembly comprising:
a filter head;
a housing attachable to the filter head; and
a filter element at least partially contained within the housing, the filter element comprising
a filter media for filtering a fluid,
an endcap coupled to and positioned at an axial end of the filter media, the endcap comprising a main wall that defines a central aperture, and
a seal member positioned within the central aperture of the endcap and adhered to the endcap, the seal member comprising a circumferential wall that extends axially below the main wall of the endcap and into a central opening of the filter media, wherein an adhesive is positioned in an area within the central opening of the filter media that is defined by an outer surface of the circumferential wall of the seal member, a lower surface of the main wall of the endcap, and an inner surface of the filter media.

14. The filter assembly of claim 13, wherein the seal member forms a seal with the filter head such that the filtered side and the unfiltered side of the filter media are fluidly separated by the seal member.

15. A filter assembly comprising:
a filter head;
a housing attachable to the filter head; and
a filter element at least partially contained within the housing, the filter element comprising
a filter media for filtering a fluid,
an endcap coupled to and positioned at an axial end of the filter media, the endcap comprising a main wall that defines a central aperture, and
a seal member positioned within the central aperture of the endcap and adhered to the endcap,
wherein the endcap comprises an upper lip that extends above an upper surface of the main wall of the endcap, wherein the seal member comprises an upper extension that is positioned above the top of the upper lip of the endcap.

16. The filter assembly of claim 13, wherein the seal member comprises an upper extension that is positioned at least partially above the endcap and a lower extension that is positioned at least partially below the endcap, wherein the upper extension and the lower extension are configured to securely attach the seal member to the endcap.

* * * * *